Figure 2:
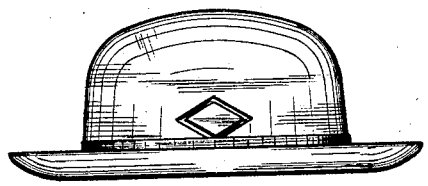

J. F. BLAKE.
MEANS FOR EMBOSSING HATS.
APPLICATION FILED FEB. 24, 1912.

1,050,795.

Patented Jan. 21, 1913.

Witnesses
Emma H. Renne
Chas. D. Edwards.

Inventor
John F. Blake
by Stewart & Stewart
his Attorney

COLUMBIA PLANOGRAPH CO., WASHINGTON, D. C.

UNITED STATES PATENT OFFICE.

JOHN F. BLAKE, OF NEW YORK, N. Y.

MEANS FOR EMBOSSING HATS.

1,050,795.

Specification of Letters Patent. Patented Jan. 21, 1913.

Application filed February 24, 1912. Serial No. 679,787.

*To all whom it may concern:*

Be it known that I, JOHN F. BLAKE, a citizen of the United States of America, residing at Brooklyn, in the county of Kings, city and State of New York, have invented certain new and useful Improvements in Means for Embossing Hats, of which the following is a specification.

In the manufacture of felt hats it is found desirable, in order to suit the taste of various purchasers, to ornament the surface of the hat with embossed figures or symbols. Felt hats, of the type to which I refer, are generally shaped to the inner surface of an external mold. For this purpose an integral mold is ordinally used. The obvious method of producing embossed figures on the surface of a hat is to mark the inner surface of the mold with the pattern which it is desired to reproduce. However, this method has various disadvantages. First, it is difficult to remove the finished hat from the mold so constructed, and, second, if the mold is marked with any pattern, all the hats produced from that mold must bear that particular pattern.

The object of my invention is to provide means for embossing the surface of a hat so constructed that it will not interfere with the withdrawal of the finished hat from the mold, and which, at the same time, has the advantage of being separate from the mold so that it may be easily removed and the embossed pattern varied to suit the style and the changing demand of the trade, and so that the same mold is available for the manufacture of either plain or embossed hats. To this end I have devised an embossing die which may be suspended from the rim of the external mold before the felt for forming the hat is introduced. The shank of the die may be attached to the rim of the mold in any convenient manner whereby it is held in a fixed position during the operation of molding and is permitted to be withdrawn in the direction in which the hat is removed from the mold, that is, the die adheres to the felt and is separated therefrom after the hat has been withdrawn from the mold.

I have illustrated my removable die in two different forms. These differ from each other in the form of the shank by means of which the die is secured to the mold. In the type which I have designated as the preferred form, the shank is L-shaped, the L being inverted, having its foot in the form of a wedge or dovetail, the top face of the rim being correspondingly notched to fit the foot. In the other form the shank is offset and there is a dove-tailed slot on the inner face of the mold to receive the offset shank which is shaped to fit the slot. It will be noted that in both instances the slot or notch in the mold is so shaped that if the embossing die is dispensed with for the purpose of producing a plain hat without the embossed ornamentation, the notch may be filled in any convenient manner, and any slight irregularity produced on the corresponding surface of the hats made in the mold under these circumstances, will be placed in an inconspicuous position, in one instance under the hat-band, and in the other on the inner or upper face of the rim. It will be apparent that the shank for suspending the die may be otherwise varied within the scope of my invention. In the type which I have described in my preferred form, the shank proper of the die is not inset in the surface of the mold but lies on the face of the mold and forms a groove in the finished hat leading to the embossed pattern, but this groove is found to be unobjectionable as it is covered by the band. In the second form of my invention the shank of the die is placed with its face flush with the surface of the mold so that it produces no irregularity on the surface of the hat other than the embossed pattern which is for purpose of ornamentation.

In the accompanying drawing I have illustrated external molds to which have been applied dies constructed in accordance with the two modifications of my invention to which I have referred. I have also shown a hat bearing an embossed pattern produced in the manner described.

Figure 1:
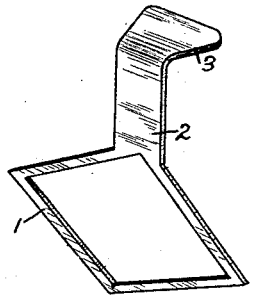
Figure 3:
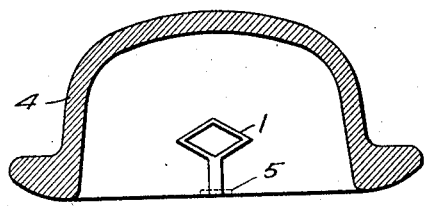
Figure 4:
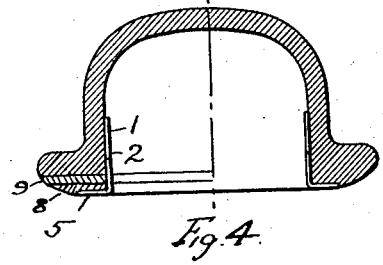
Figure 5:
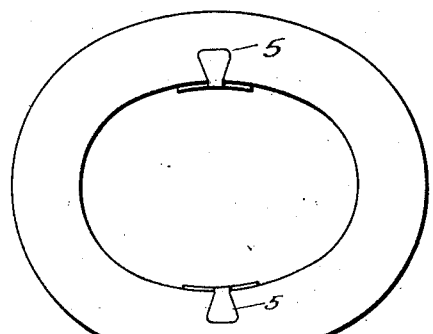
Figure 6:
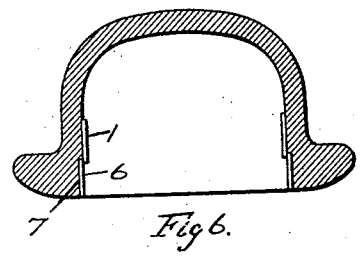
Figure 7:
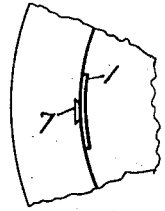

Figure 1 shows the preferred form of die. Fig. 2 shows an embossed hat. Figs. 3 and 4 are respectively a longitudinal and transverse section of a mold to which dies constructed in accordance with the preferred form of my invention are applied, the latter being divided centrally to show a slight variation in form. Fig. 5 is a plan of the same. Fig. 6 is a transverse cross-section of a mold to which have been applied two dies constructed in accordance with the second form of my invention. Fig. 7 is a fragmentary plan of the same.

The die proper may take any form which it is desired to produce on the surface of the hat as a symbol or ornamental design. In the finished hat, and in the die shown this symbol or design takes the outline of a diamond, but this is immaterial in my invention. The die shown in Fig. 1 consists of the die proper or imprinting portion 1 with a shank 2 which in this instance is in the plane of the die proper. This shank is in the form of an inverted L, the foot 3 of the L being in the form of a wedge or dove-tail. The mold 4 is notched or slotted at 5 to receive the foot of the shank, and it will be observed that when the die is in place with the foot of the shank in the notch 5, the die can be withdrawn in the direction of the opening of the mold, i. e., the direction in which the molded hat is removed. In Figs. 6 and 7 I have shown a die which is similar except that the shank 6 is offset and lies in a dove-tailed groove 7 in the inner face of the mold. In the operation of this die the shank produces no impression on the surface of the hat while in the operation of the die shown in Figs. 1, 3, 4 and 5, the shank forms a groove in the hat which must be covered by the hat-band.

It will be apparent that the dies which I have described may be used equally well with an integral mold as with one deepened by means of lifters, i. e., flat rings 8 and 9, see the left side of Fig. 4 applied to the rim. These must be notched to suit the die shank.

The operation of the device of my invention will be clearly understood from the preamble taken in connection with the drawing and description. The die is first suspended from the rim of the mold, in one instance, the dove-tailed foot 3 being placed in the dove-tailed notch 5, and in the other, the shank 6 being seated in the dove-tailed slot 7. Following this a body of felt, at sufficiently high temperature, is shaped to the inner face of the mold, the die forming an indentation therein. When the body has set to the desired degree, the hat is withdrawn, the die adhering to the hat and being disengaged from the mold in an obvious manner. After the hat has been removed from the mold, the die is easily separated therefrom either immediately after molding or later.

It will be apparent that to produce an embossed hat by the use of a die constructed in accordance with my invention, any mold may be used, and that the mold employed need be altered but slightly, and that when so altered, is still available for use in making plain or unembossed hats. At the same time, the quality of the embossed hats manufactured by the use of my improved die is better than could be made in a mold having the embossed pattern cut therein, provided the embossed pattern could be made in such a mold, as in withdrawing the hat from the mold thus constructed, the embossed designs must necessarily be disfigured and lose their sharpness. In fact it would be practically impossible, under these circumstances, to withdraw a stiff hat without completely destroying it.

I have thus described, in specific terms, two embodiments of my invention in order that the nature and operation of the same may be clearly understood. However, the specific terms herein are used in their descriptive rather than in their limiting sense, and the scope of the invention is defined in the claims.

I claim:

1. In combination with an external mold for hats, a die suspended from the rim thereof and removable in the direction of the opening of the mold.

2. In combination with a one-piece external mold for hats, an embossing die suspended on the inner face of the mold and removable therefrom only in the direction in which the finished hat is removed.

3. In combination with an external mold for hats, an embossing die having a dove-tailed shank, the mold having a dove-tailed opening to receive the shank so that the die may be suspended by the shank and rest against the inner face of the mold, and be removable only in the direction of the mold opening.

4. In combination with a hat mold, a die having a shank with an offset foot so that the die may be attached to the mold by means of the foot and at the same time be removable with the finished hat.

5. In combination with a mold for hats, a die and means for attaching the same to the mold so that it may be permitted to adhere to the hat formed in the mold and removed with the molded hat.

6. In combination with an external mold for hats, an embossing die suspended from the rim thereof and resting against the inner face of the mold.

Signed by me at New York city, county and State of New York, this 21st day of February, 1912.

JOHN F. BLAKE.

Witnesses:
EMMA W. RENNÉ,
HENRY BEST.